Figure 1:
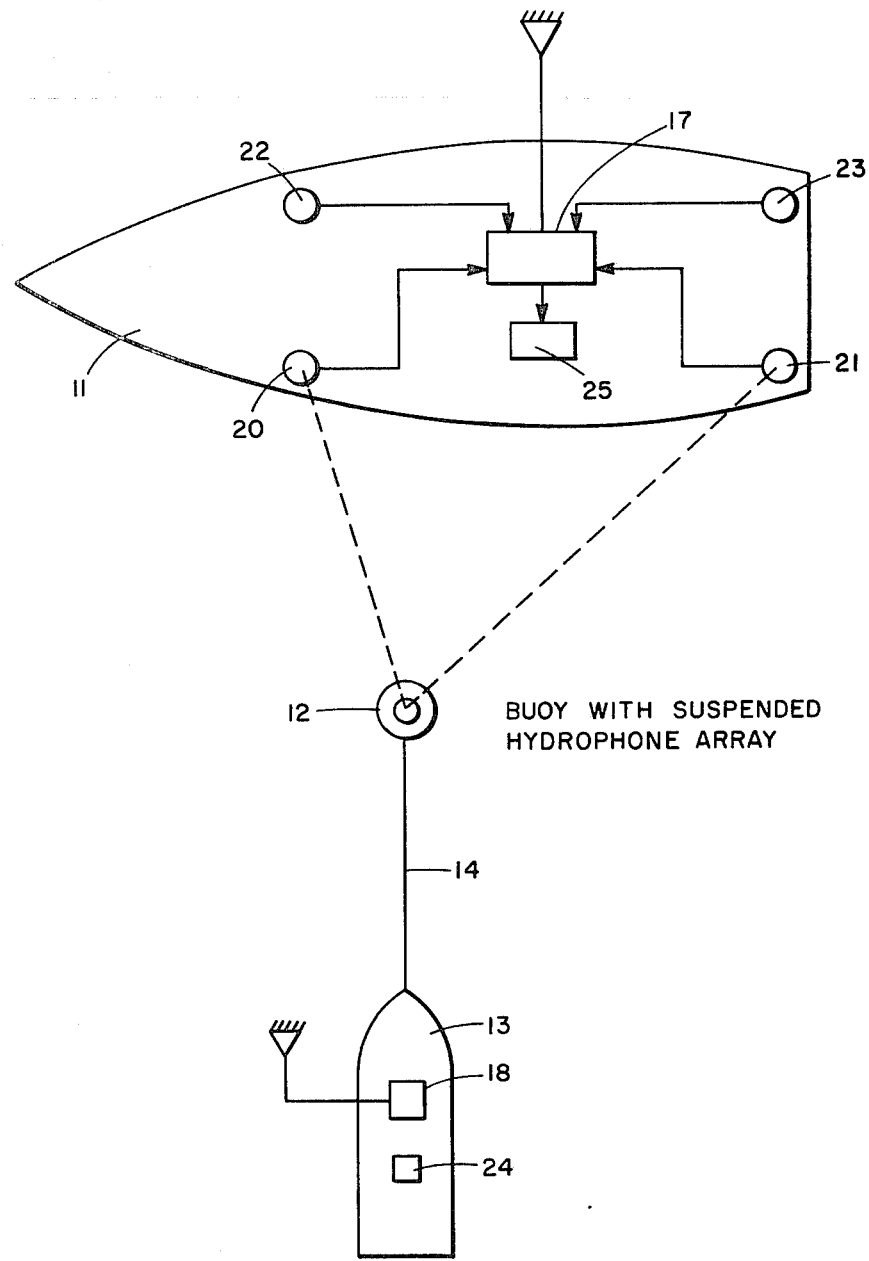

United States Patent [19]
Menoche

[11] 3,713,082
[45] Jan. 23, 1973

[54] OPTICAL RANGING SYSTEM

[75] Inventor: Richard K. Menoche, Portsmouth, N.H.

[73] Assignee: The United States of America as represented by the Secretary of the Navy

[22] Filed: Sept. 1, 1971

[21] Appl. No.: 176,934

[52] U.S. Cl. ................... 340/5 R, 340/6 R, 356/1
[51] Int. Cl. ............................................. H04b 11/00
[58] Field of Search ......... 340/5 R, 5 C, 6 R, 16 R, 2, 340/4 R; 356/1, 141, 152

[56] References Cited

UNITED STATES PATENTS

| | | | |
|---|---|---|---|
| 3,202,040 | 8/1965 | Burkhart | 356/1 |
| 3,622,961 | 11/1971 | Vasiloff | 340/5 C |

Primary Examiner—Richard A. Farley
Attorney—R. S. Sciascia et al.

[57] ABSTRACT

A ranging system for determining point-continuous ranges in real time between a surface ship and a hydrophone array using optical and electronic devices on board ship and having an accuracy of ±5 percent at ranges up to 1500 yards is provided. Pairs of transits on each side of the ship each contain a high resolution digital encoder which is mechanically coupled to a telescope of selected power. The fore and aft encoders on either side are sampled at selected intervals of the forward encoder, causing a digital printer on board ship to print out the observed angle of a buoy which marks the position of the hydrophone array. Data is earmarked when the forward encoder is abeam of the buoy and the closest point of approach in yards is calculated. Hydrophone readings at the CPA provide a reliable acoustic signature of the ship at the calculated range.

10 Claims, 2 Drawing Figures

OPTICAL RANGING SYSTEM

The present invention concerns systems for determining the acoustic signature of surface ships and submarines and more particularly a system for determining such acoustic signatures in real time.

Present means for obtaining the radiated acoustic signatures of surface ships, in particular, in order to determine their detectability characteristics involve the use of a listening ship and a hydrophone array both of which are moored to an anchor buoy. The test vehicle attempts to pass the array within predetermined range limits since, for precise determination of acoustic levels, it is necessary to obtain accurate range measurements between the receiving hydrophone and the test vehicle. For directivity measurements, it is necessary to know the relative heading of the test vessel at all times. The acoustic ranging signals generated are by their very nature acoustic pulses of a level higher than a test ship's radiated normal noise characteristic. These signals create a high noise level which is unacceptable since the pulses of the ranging system will invalidate at least part of the recorded data forming the acoustic signature.

Existing acoustic ranging systems also are undesirable in that they require hull penetrations and/or underwater mounting of equipment, and the acoustic pulses are not predictable in that they are susceptible to interference from the test ship's flow noise and pronounced thermogradiants. These systems usually do not provide for the test ship's relative bearing during a run, they are located at established stations in shallow water or require fixed shore installations, and where ship's radar is used for deep water ranging the range measurements are not sufficiently accurate for a radiated noise survey. The present invention provides a method of and means for obtaining ranges which avoid the deficiencies of the prior methods and means, is transportable for deep or shallow water operation and does not require interfering acoustic transmissions.

Briefly, the present invention comprises a system for obtaining the acoustic signature of a ship which includes on the test ship a pair of transits, encoders electrically coupling the transits to forward and aft electronic components, a digital printer and a transmitter for telemetering data to the receiving ship. On the receiving ship are a radio receiver, transducer output filters, and amplifiers, and an analog tape recorder. The receiving ship is moored to a buoy from which is suspended a hydrophone array which is electrically connected to the receiving ship electronics. The overall system operates by acoustic data being sampled by the hydrophone array at selected attitudes and positions of the test ship with respect thereto. The fore and aft encoders on the side of the test ship adjacent to the hydrophone array are sampled at selected intervals such as 5° or 10° of the forward encoder causing the digital printer aboard the test ship to print out the observed transit angle of the marker buoy. The angle at which each transit reading is taken is transmitted to the receiving ship where this data is superimposed on a tape recording of the acoustical information obtained from the array of hydrophones. Fore and aft lamp banks on the test ship visually display the relative angle of each sampling of acoustic data. By making port and starboard runs, a polar plot is obtained of the acoustic signature of the test vessel.

Accordingly, it is an object of the present invention to provide an optical ranging system which enables continuous ranges to be determined in real time between a surface ship and a hydrophone array.

Another object of this invention is to provide a system for obtaining radiated acoustic signatures by equipment which is readily transportable for deep water or shallow water survey operations.

A further object of this invention is to provide an optical ranging system wherein the relative position between the test ship and the hydrophone array is precisely recorded and readily related to the acoustic signature obtained without any acoustic interference from either the test ship or the listening ship.

Figure 2:
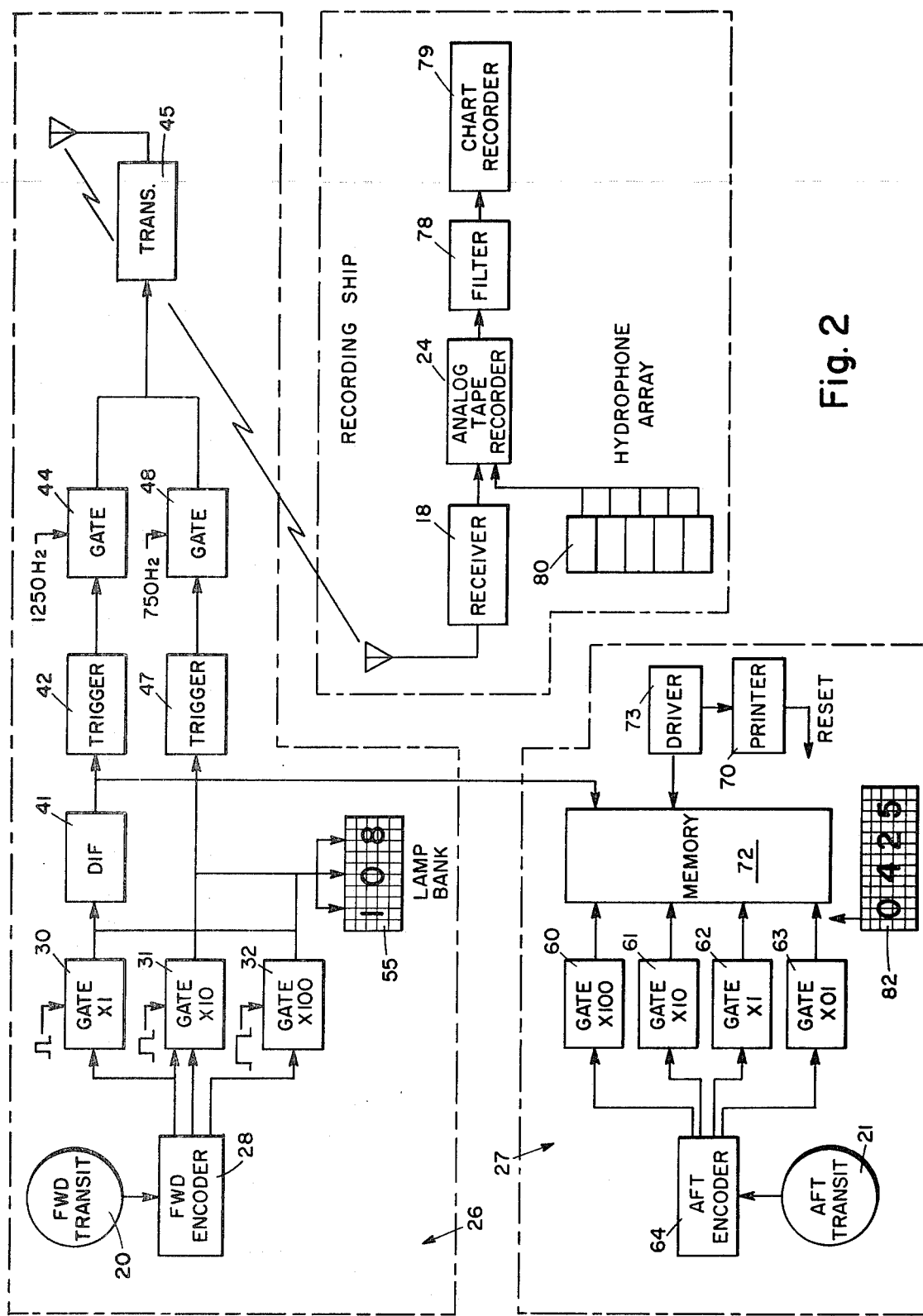

Other objects, advantages and novel features of the invention will become apparent from the following detailed description thereof when considered in conjunction with the accompanying drawings in which like numerals represent like parts throughout and wherein:

FIG. 1 is a schematic diagram of the system showing the relation between test ship, hydrophone array, listening ship and the location of equipment used; and FIG. 2 is a block diagram of the circuits and components used in the system.

Referring to FIG. 1, a ship 11 is shown progressing past a suspended hydrophone array, not shown, which is deployed beneath a marker buoy 12. A listening ship 13 is moored to buoy 12 by mooring line 14, the listening ship and test ship having communication established there-between by means of the transmitter 17 and associated electronics on the test ship and a receiver 18 on the listening ship. The equipment on the test ship associated with transmitter 17 includes forward and aft electronic circuits which are electrically coupled to preferably manually operated transits 20 – 23 and a digital printer 25. On the listening ship a tape recorder 24 is coupled to receiver 18 and the hydrophone array.

In FIG. 2 the forward and aft electronics are divided into forward and aft subsystems 26 and 27. In subsystem 26 a forward encoder 28 is mechanically coupled to one of the forward transits, 20 for example. The output of encoder 28 is fed to gates 30 – 32 which provide units, tens and hundreds of degrees information to the system. The units 0° and 5° outputs of gate 30 are supplied to a differentiator 41 which shapes these pulses so as to give them a peaked form. Thereafter, this signal operates a trigger circuit 42 which opens a gate 44 coupled through for a predetermined time interval so that a locally generated signal of a first frequency, $f_1$, is coupled to a local transmitter 45 for transmission to the listening ship. Thus, for each 5° pulse originating at the forward encoder, a corresponding radio frequency pulse is broadcast by the test ship to the listening ship for reception and subsequent recording, as will be seen hereinafter. Tens of degrees information is supplied from gate 31 to a trigger circuit 47 which opens a gate 48. In addition to the tens of degrees information, a 90° pulse at the closest point of approach, CPA, is also derived from gate 31 via forward encoder 28. This additional pulse is identified when the forward transit is directed precisely at 90° to the center line of the ship and when it appears, it activates trigger 47 so as to open gate 48 to permit a second signal of a frequency $f_2$ to be coupled to transmitter 45 and be radioed to the remote listening ship.

Hundreds of degrees information is supplied through the gate 32 to differentiator 41 as described in connection with the pulse emanating from gate 30. A lamp bank 55 which is adapted to display bearings in three digits is connected to respective ones of gates 30, 31 and 32 so that a visual indication of the bearing of the forward transit is available at all times.

Subsystem 27 is similar in form to subsystem 26, gates 60, 61 and 62 providing hundreds, tens and units of degrees information while an additional gate 63 provides for tenths of degrees information. An aft encoder 64 is coupled to one of the aft transits, 21 for example, with the output of the encoder fed to gates 60 – 63. The test ship is provided with a printer 70 which operates to record the bearing of the aft encoder 64 each time forward encoder 28 generates a particular 5° pulse. To accomplish this, aft encoder 64 utilizes a memory circuit 72 which, in effect, continuously stores the setting of aft encoder 64 throughout a test run. Periodically, this memory is read out to a driver 73 and to printer 70 each time a pulse appears in the output circuit of differentiator 41.

On the listening ship 13, receiver 18 receives the $f_1$ and $f_2$ pulse information from transmitter 17 and feeds this information to analog tape recorder 24 which recorder also receives acoustic data input information from the hydrophones in a hydrophone array 80. Information from recorder 24 is then filtered in a filter 78 and fed to a strip chart recorder 79 where it is simultaneously stored and displayed for review and analysis. The outputs of gates 60 – 63 in subsystem 27 are also fed to an aft lamp bank 82 which provides four-digit information indicating the angular position of the aft transit from hundreds to tenths of degrees.

In the embodiment in FIG. 1, transits 20 and 21 are manned during a run and are so operated and correlated by conventional visual or audio means, not shown, that readings of the aft transit on buoy 12, i.e. the angular position of the aft encoder, are sampled at intervals such as 5° of the forward transit. Therefore, as the test ship travels past the stationary remote listening ship on a course such as the one shown in FIG. 1 and as the optical apparatus of forward encoder 28, for example, tracks the remote target, corresponding electrical pulses will appear at the input of gate 30. Although only one line is shown interconnecting the output of the forward encoder with the input of gate 30, it will be readily understood that this interconnection represents the number of individual lines as there are individual electrical contact elements of the coded discs which are mechanically coupled to transit 20. For example, at least three discs are contemplated to be coupled to transit 20, a first disc divided into four sectors of roughly 100° each, a second disc divided into 10 sectors of 36° each and a third disc divided into 10 sectors of 36° each. Aft transit 21 is contemplated to have a fourth disc coupled thereto which disc would be divided into 36 sectors each representing one-tenth of a degree. The various discs are conventionally connected to gears whose ratios are 10 to 1 for all but the first disc of each encoder so that a full rotation of the fourth disc of the aft encoder represents 1° on the third disc thereof, and a full rotation of the third disc represents 10° on the second disc thereof and a full rotation of the second disc represents any of three sectors of 100° or a sector of 60° on the first disc thereof.

The operation of each encoder anticipates the uninterrupted, regular movement of the test vehicle past the listening ship so that in any one particular run the forward encoder will operate in a continuous manner, generating successive pulses of a spacing and duration determined by the speed of the test ship. As the test ship increases its speed, therefore, the series of pulses appearing at the input to gate 30 will be of shorter duration and have decreased interpulse spacing.

It will thus be appreciated that the system of the present invention avoids the production of high amplitude acoustic pulses which may interfere with analysis of recorded data by limiting acoustic sources to those of the test ship only. The system also avoids a necessity for hull penetration or underwater mounting of equipment and is not affected by a pronounced thermogradiance or by interference produced by the test ship's flow noise. Real-time correlation with recorded data is provided and an accuracy of plus or minus 3% in comparison with shore based ranging facilities has been achieved. This comparison with a complex shore installation is indicative of the value of the present portable system which may be installed in a short time aboard any surface ship.

Obviously, many modifications and variations of the present invention are possible in the light of the above teachings. For example, the printer may be placed aboard the listening ship and information may be telemetered to it from the test ship. Also, the port and starboard subsystems may be replaced by a single two-transit system mounted higher in the superstructure and with a clearer view to both port and starboard. A greater number of oscillator frequencies may be used to mark different portions of a run for better correlation of pulses with the acoustic signature. Further, the electronic equipment may be modified so that both fore and aft bearings are simultaneously printed. And finally, the transits may be mounted on the listening ship and tracking on the test ship accomplished from the listening ship.

What is claimed is:

1. A system for determining point-continuous ranges in real time between a test ship and a hydrophone array, comprising
   at least two relative direction indicating means on said ship for determining relative bearings and distances of said ship from objects by triangulation;
   a marker buoy having a hydrophone array suspended therefrom;
   a listening ship moored to said marker buoy;
   recorder means on said listening ship coupled to said hydrophone array for recording acoustic data input information from said array;
   means coupled to said indicating means for electromagnetically transmitting signals representative of selective relative bearings to said listening ship; and
   receiver means on said listening ship coupled to said recorder means for receiving relative bearing signal information and superimposing said signal information on said acoustic data information, whereby, as said test ship proceeds past said buoy on a course preferably transverse to said hydrophone array, the distance from the test ship to the array and the relative bearing of the array from the test ship are continuously computed and recorded so that a substantially instantaneous acoustic signature of the test ship may be obtained.

2. The system as defined in claim 1 wherein said direction indicating means include forward and aft transits coupled to encoders and gates for generating pulses representative of said relative bearings, said gates providing units, tens and hundreds of degrees information from said forward transit and tenths, units, tens and hundreds of degrees information from said aft transit; and trigger circuit means operable by the gates associated with said forward transit and connected to a signal source and a transmitter for generating and transmitting signals representative of bearings at 5° intervals and at 90° to said receiver means.

3. The system as defined in claim 2 wherein said trigger circuit means includes separate triggers for said units gate and said tens gate, said separate triggers each coupled to a separate signal generator so that signals generated by the forward units gate may be substantially different in frequency from the signals generated by the forward tens gate.

4. The system as defined in claim 3 wherein said aft gates and said forward gates are connected to a memory circuit for continuously storing the setting of said aft encoder during a test run;

a driver connected to said memory circuit and a printer connected to said driver for printing on command the aft four-digit bearing angle which has been stored in said memory circuit; and forward and aft lamp banks connected to respective forward and aft gates for visually displaying instantaneous bearings of the forward and aft transits.

5. A method of passively obtaining the radiated acoustic signatures of ships, comprising the steps of suspending a hydrophone array from a buoy in a navigable body of water;

coupling recording means to the hydrophone array and to a radio receiving unit deployed in the vicinity of said buoy;

directing a test ship along a course transverse to said array;

determining relative bearings of said buoy from said test ship by at least a pair of transits thereon spaced a selected distance apart; and telemetering bearing information from said test ship to said receiving unit so that a substantially instantaneous acoustic signature of said test ship may be obtained by a polar plot of bearings and acoustic signal levels for selected ranges taken on reciprocal courses.

6. The method as defined in claim 5 wherein bearings are taken simultaneously on two transits at 5° intervals of the forwardmost transit.

7. The method as defined in claim 6 wherein a separate frequency is employed for said signals at 5° intervals and for a signal at the closest point of approach at 90°.

8. The method as defined in claim 7 and further including visually displaying the bearing of each transit and storing the bearing information in a memory circuit for subsequent readout to a driver and printer.

9. A method of obtaining the radiated acoustic signature of ships which does not require interfering acoustic transmissions comprising the steps of sampling acoustic data of a ship under test by a hydrophone array deployed at a selected attitude with respect to test courses of said ship;

sampling relative bearings of the hydrophone array from a forward and an aft transit on said ship;

transmitting by non-acoustical means selected ones of said bearings to a receiving unit adjacent said hydrophone array; and superimposing on a recording means acoustical information from said hydrophone array and bearing information from said test ship to form acoustic signatures of said test ship at selected distances therefrom.

10. Means for sampling the acoustic data of a ship whose acoustic signature is desired without recourse to interfering acoustic transmissions comprising a hydrophone array deployed in navigable water at a selected attitude with respect to the test course of said ship;

a receiving station deployed on the surface adjacent to said array, said receiving station having recording means coupled to said array and a radio receiver tuned to selected frequencies and coupled to said recording means;

at least a pair of relative bearing indicating means on said ship positioned at spaced forward and aft stations;

an encoder mechanically coupled to each of said relative bearing means and electrically coupled to a plurality of electronic gates associated with each station for providing units, tens and hundreds of degrees information from the forward station to said sampling means and tenths, units, tens and hundreds of degrees information from the aft station to said sampling means; and differentiator, trigger, signal generator and transmitter means connected in series with said forward gates for selecting, generating and transmitting signals representative of bearings at 5° intervals and at 90° to said radio receiver, whereby as said ship passes said array acoustic data from said array and relative bearing data from said ship may be superimposed in said recording means to form an acoustic signature of said ship for selected distances therefrom without reliance on and interference from acoustic or radar ranging pulses.

* * * * *